US010469010B2

United States Patent
Seki et al.

(10) Patent No.: US 10,469,010 B2
(45) Date of Patent: Nov. 5, 2019

(54) MOTOR DRIVE CONTROLLER, CONTROL METHOD FOR MOTOR DRIVE CONTROLLER, CONTROL PROGRAM FOR MOTOR DRIVE CONTROLLER, AND METHOD FOR DETERMINING NUMBER OF DIVISIONS OF BASIC STEP ANGLE

(71) Applicant: Minebea Mitsumi Inc., Nagano (JP)

(72) Inventors: Tetsuya Seki, Fukuroi (JP); Kei Yamazaki, Ota-ku (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 15/912,712

(22) Filed: Mar. 6, 2018

(65) Prior Publication Data
US 2018/0262136 A1 Sep. 13, 2018

(30) Foreign Application Priority Data

Mar. 8, 2017 (JP) .................................. 2017-043987

(51) Int. Cl.
*H02P 8/22* (2006.01)
*H02P 6/28* (2016.01)
*H02P 8/02* (2006.01)
*H02P 8/12* (2006.01)
*H02P 27/08* (2006.01)

(52) U.S. Cl.
CPC ................. *H02P 8/22* (2013.01); *H02P 6/28* (2016.02); *H02P 8/02* (2013.01); *H02P 8/12* (2013.01); *H02P 27/085* (2013.01); *H02P 2209/09* (2013.01)

(58) Field of Classification Search
CPC ...... H02P 8/22; H02P 6/28; H02P 8/02; H02P 8/12; H02P 27/085
USPC .......................................................... 318/671
See application file for complete search history.

(56) References Cited

U.S. PATENT DOCUMENTS

| | | | |
|---|---|---|---|
| 5,914,580 A * | 6/1999 | Senoh ....................... | H02P 8/22 318/685 |
| 5,966,220 A * | 10/1999 | Miyamoto ........... | H04N 1/0473 358/475 |
| 6,009,292 A | 12/1999 | Jinbo et al. | |

(Continued)

FOREIGN PATENT DOCUMENTS

| | | |
|---|---|---|
| JP | 64-051867 A | 2/1989 |
| JP | 10-136694 A | 5/1998 |

(Continued)

OTHER PUBLICATIONS

Japanese Office Action dated Jul. 29, 2019 for corresponding Japanese Application No. 2017-043987 and English translation.

*Primary Examiner* — Kawing Chan
(74) *Attorney, Agent, or Firm* — Pearne & Gordon LLP

(57) ABSTRACT

A motor drive controller capable of taking measures against vibration or noise of a motor is provided. The motor drive controller configured to drive a stepping motor in microstepping mode controls the number of PWM (Pulse Width Modulation) cycles contained in one microstep cycle. More specifically, the number of PWM cycles contained in one microstep cycle is controlled so that a vibration contained in a current waveform determined by the number of PWM cycles contained in one microstep cycle does not approximate the natural frequency of the stepping motor.

8 Claims, 6 Drawing Sheets

(56) References Cited

U.S. PATENT DOCUMENTS

| | | | |
|---|---|---|---|
| 6,414,460 B1 | 7/2002 | Li et al. | |
| 6,490,057 B1* | 12/2002 | Sakaguchi | H04N 1/3935 |
| | | | 358/412 |
| 2006/0108964 A1* | 5/2006 | Shibatani | G05B 19/40 |
| | | | 318/685 |
| 2012/0189926 A1* | 7/2012 | Yabutani | H01M 8/04425 |
| | | | 429/414 |
| 2014/0368676 A1* | 12/2014 | Yoshimuta | H02P 8/22 |
| | | | 348/207.99 |
| 2016/0365812 A1* | 12/2016 | Nakamura | H02P 8/30 |
| 2017/0099021 A1* | 4/2017 | Russ | H02P 8/08 |

FOREIGN PATENT DOCUMENTS

| | | | |
|---|---|---|---|
| JP | 2000352782 A | * | 12/2000 |
| JP | 2003-309999 A | | 10/2003 |

\* cited by examiner

| ROTATION SPEED | CONTROL BY PRIOR ART<br>TWO PWMS IN ONE MICROSTEP | CONTROL BY PRESENT EMBODIMENT<br>THREE PWMS IN ONE MICROSTEP |
|---|---|---|
| 360pps | 32 MICROSTEPS | 16 MICROSTEPS |
| 480pps | 32 MICROSTEPS | 16 MICROSTEPS |
| 640pps | 32 MICROSTEPS | 8 MICROSTEPS |
| 800pps | 32 MICROSTEPS | 8 MICROSTEPS |

FIG.4

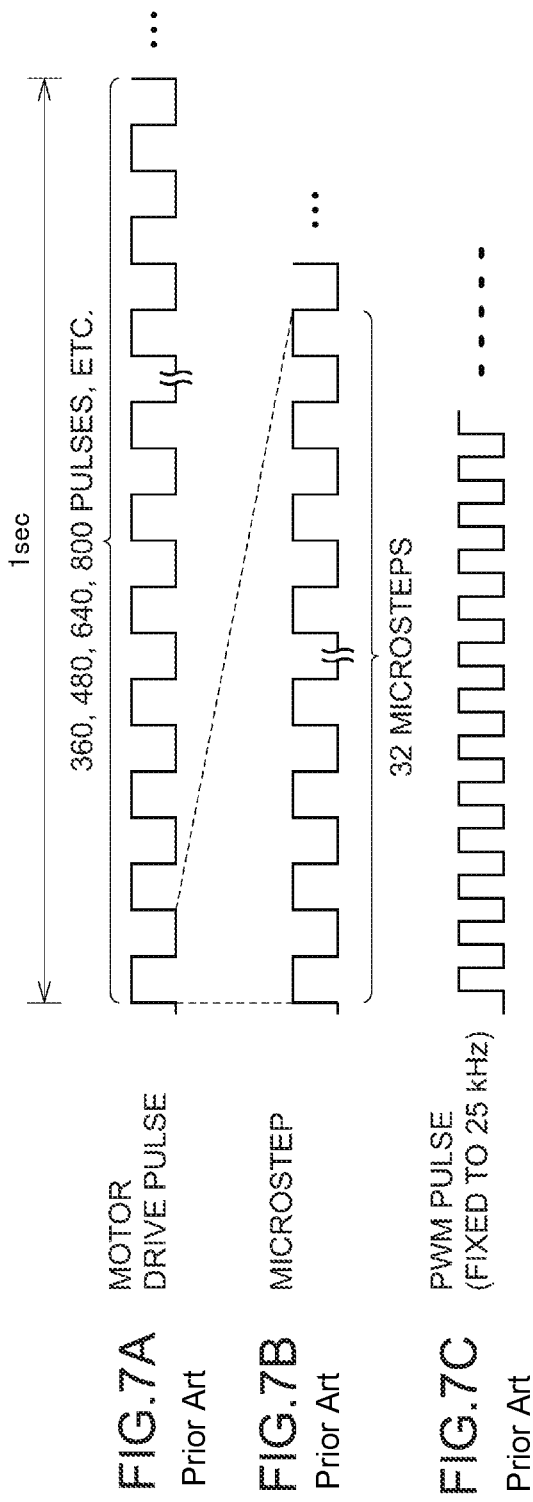

MOTOR DRIVE CONTROLLER, CONTROL METHOD FOR MOTOR DRIVE CONTROLLER, CONTROL PROGRAM FOR MOTOR DRIVE CONTROLLER, AND METHOD FOR DETERMINING NUMBER OF DIVISIONS OF BASIC STEP ANGLE

CROSS REFERENCE TO RELATED APPLICATIONS

This application claims the benefit of Japanese Patent Application No. 2017-043987, filed Mar. 8, 2017, which is hereby incorporated by reference in its entirety.

BACKGROUND

Technical Field

The present disclosure relates to a motor drive controller, a control method for the motor drive controller, a control program for the motor drive controller, and a method for determining the number of divisions of a basic step angle (number of microsteps), and more particularly to a motor drive controller, a control method for the motor drive controller, a control program for the motor drive controller, and a method for determining the number of divisions of the basic step angle (number of microsteps) capable of taking measures against vibration or noise of a motor.

Background

Microstep driving is a driving method for further finely controlling a basic step angle of a stepping motor by current control of a driver, i.e., a drive circuit. More specifically, the microstep driving is a method for achieving operation at a smaller step angle than the basic step angle by finely dividing a current distribution flowing through each coil included in the motor.

FIGS. 7A, 7B, and 7C each are a timing chart for explaining the microstep driving.

In FIGS. 7A, 7B, and 7C, the horizontal axis indicates time. FIG. 7A illustrates an example waveform of a motor drive pulse (basic step of motor driving). FIG. 7B illustrates an example waveform of a microstep. FIG. 7C illustrates an example waveform of a PWM (Pulse Width Modulation) cycle (pulse for PWM control).

As illustrated in FIG. 7A, the number of drive pulses (basic steps) of the stepping motor is controlled to 360 pulses, 480 pulses, 640 pulses, 800 pulses, etc., per second (sec) according to the rotation speed of the motor (360 pps (pulse/sec), 480 pps, 640 pps, 800 pps, etc.). The greater the number of pulses, the faster the motor rotates.

As illustrated in FIG. 7B, one cycle of a drive pulse of the stepping motor is divided into, for example, 32 microsteps, one of which is defined as one microstep cycle.

As illustrated in FIG. 7C, the base frequency of PWM control is fixed to 25 kHz in this embodiment. When the base frequency of PWM control is equal to or less than 20 kHz, motor sound deteriorates, and when the base frequency of PWM control is equal to or greater than 30 kHz, CPU computation load increases. Thus, it is desirable to set the base frequency of PWM control within a range of 20 kHz to 30 kHz.

For example, assuming that the rotation of the motor is controlled at 360 pulses per second and one pulse is divided into 32 microsteps, theoretically 360×32=11,520 microsteps are contained in one second and the microstep frequency is 11,520 Hz=11.52 kHz. Since the base frequency of PWM control is fixed to 25 kHz, the number of PWM control pulses per cycle of microstep is theoretically 25/11.52=2.17.

Even if the rotation of the motor is controlled at 480 pulses per second faster than 360 pulses per second, one pulse is also divided into 32 microsteps. Thus, theoretically 480×32=15,360 microsteps are contained in one second and the microstep frequency is 15,360 Hz=15.36 kHz. Since the base frequency of PWM control is fixed to 25 kHz, the number of PWM control pulses per microstep cycle is theoretically 25/15.36=1.63.

Japanese Patent Application Laid-Open No. 2003-309999 discloses a technique of driving a stepping motor in microstepping mode. Japanese Patent Application Laid-Open No. 2003-309999 further discloses a stepping motor driver capable of suppressing generation of noise caused by motor driving and capable of reducing the burden of control processing by a microcomputer.

The stepping motor driver disclosed in Japanese Patent Application Laid-Open No. 2003-309999 includes a control means configured to control the number of divisions of a drive signal in one cycle so that the product of the frequency of the drive signal of the stepping motor and the number of divisions of the drive signal in one cycle is a constant frequency across the drive speed of the motor; and a filter configured to attenuate the sound level of a constant frequency signal.

SUMMARY

When a multiplication component of the PWM base frequency (clock frequency) contained in one microstep cycle approximates the natural frequency of the motor, a resonance phenomenon occurs. Occurrence of the resonance phenomenon leads to vibration or noise of the motor. The technique disclosed in Japanese Patent Application Laid-Open No. 2003-309999 cannot solve vibration issues or noise of the motor caused by such a phenomenon.

The present disclosure is related to providing a motor drive controller, a control method for the motor drive controller, a control program for the motor drive controller, and a method of determining the number of divisions of a basic step angle (number of microsteps) capable of taking measures against vibration or noise of a motor.

In accordance with one aspect of the present disclosure, a motor drive controller is configured to drive a stepping motor in microstepping mode, wherein the motor drive controller controls the number of PWM (Pulse Width Modulation) cycles contained in one microstep cycle.

Preferably the motor drive controller satisfies the relationship of the following expression:

$$m \geq k \times f1/f0$$

where f1 denotes a PWM base frequency, f0 denotes a natural frequency of a motor, m denotes the number of PWM cycles contained in one microstep cycle, and k denotes a margin coefficient for the natural frequency.

Preferably the motor drive controller controls so that the number of PWM cycles contained in one microstep cycle is equal to or greater than the m according to a rotation speed of the stepping motor.

Preferably in the motor drive controller, the number of PWM cycles contained in one microstep cycle is controlled so that a vibration contained in a current waveform determined by the number of PWM cycles contained in one microstep cycle does not approximate the natural frequency of the stepping motor.

Preferably the motor drive controller has a function of changing the number of PWM cycles contained in one microstep cycle according to a rotation speed of the stepping motor.

Preferably in the motor drive controller, microstepping is performed by dividing a basic step angle of the stepping motor, and the motor drive controller controls the number of PWM cycles contained in one microstep cycle by adjusting the number of divisions.

In accordance with another aspect of the present disclosure, a control method for a motor drive controller configured to drive a stepping motor in microstepping mode comprises controlling the number of PWM (Pulse Width Modulation) cycles contained in one microstep cycle.

In accordance with yet another aspect of the present disclosure, a control program for a motor drive controller configured to drive a stepping motor in microstepping mode causes a computer to execute a step of controlling the number of PWM (Pulse Width Modulation) cycles contained in one microstep cycle.

In accordance with yet another aspect of the present disclosure, a method of determining the number of divisions of a basic step angle (number of microsteps) for a motor drive controller configured to drive a stepping motor in microstepping mode determines the number of divisions of the basic step angle (number of microsteps) so that a vibration contained in a current waveform determined by the number of PWM cycles contained in one microstep cycle does not approximate the natural frequency of the stepping motor.

The present disclosure can provide a motor drive controller, a control method for the motor drive controller, a control program for the motor drive controller, and a method of determining the number of divisions of basic step angle (number of microsteps) capable of taking measures against vibration or noise of a motor.

BRIEF DESCRIPTION OF THE DRAWINGS

FIG. 4 is a diagram describing the driving of the stepping motor performed by the motor drive controller in comparison with the prior art;

FIGS. 7A, 7B, and 7C are timing charts explaining microstep driving.

DETAILED DESCRIPTION

Figure 1:
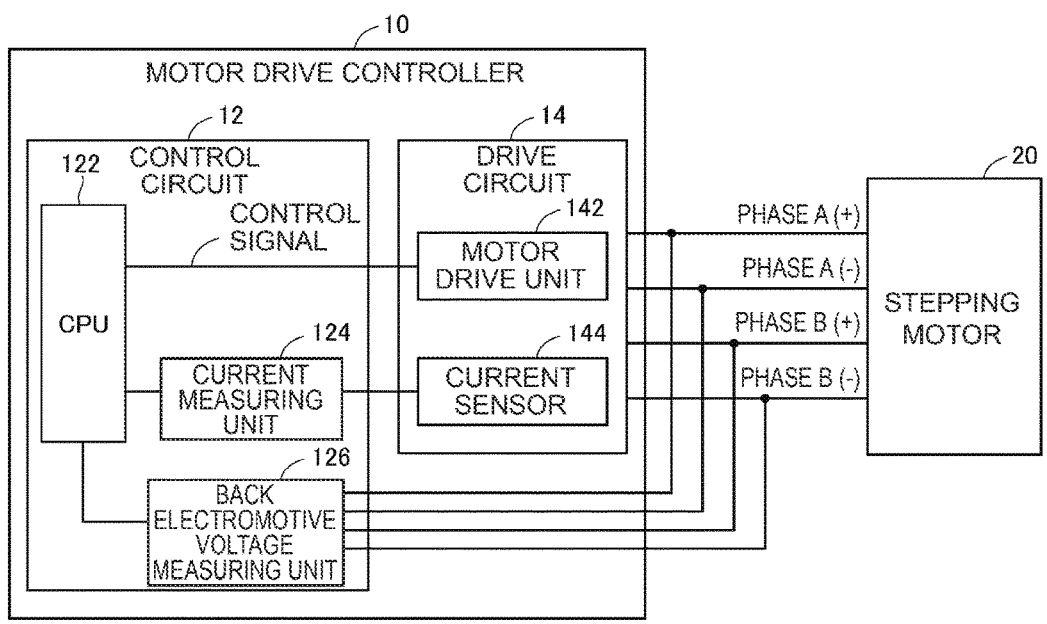
FIG. 1 is a block diagram of a motor and a motor drive controller according to an embodiment of the present disclosure.

FIG. 1 is a block diagram of a motor and a motor drive controller according to an embodiment of the present disclosure.

As illustrated in FIG. 1, an apparatus 1 includes a motor drive controller 10, a stepping motor 20, an unillustrated gearbox, and a casing accommodating these. The stepping motor 20 is driven, for example, by two-phase excitation of phase A and phase B. The stepping motor 20 includes a coil of phase A and a coil of phase B (illustrated in FIG. 2). The stepping motor 20 is driven by drive power supplied from the motor drive controller 10 to the coil of each phase. The stepping motor 20 may be used, for example, as an actuator for an air conditioner installed in a vehicle. However, the application of the stepping motor 20 is not limited to this.

As described above, the stepping motor 20 includes coils of a plurality of phases. The motor drive controller 10 controls the conductive state of the coil of each phase. In addition, the motor drive controller 10 has a microstepping function of subdividing the basic step angle.

The motor drive controller 10 includes a control circuit 12 and a drive circuit 14.

The drive circuit 14 includes a motor drive unit 142 and a current sensor 144. The drive circuit 14 supplies drive power to the stepping motor 20 to drive the stepping motor 20.

The control circuit 12 includes a CPU (central processing unit; an example of a computer) 122, a current measuring unit 124, and a back electromotive voltage measuring unit 126. The control circuit 12 controls driving of the stepping motor 20 by controlling the drive circuit 14. In this embodiment, the control circuit 12 is packaged as an IC (integrated circuit).

The motor drive unit 142 is a module for applying a voltage to the coil of each phase of the stepping motor 20. The motor drive unit 142 receives a control signal from the CPU 122. The motor drive unit 142 applies a voltage based on the control signal. In this embodiment, the drive circuit 14 and the stepping motor 20 are connected by four lines: a line for a positive electrode of phase A (+), a line for a negative electrode of phase A (−), a line for a positive electrode of phase B (+), and a line for a negative electrode of phase B (−). The motor drive unit 142 supplies drive power to the stepping motor 20 through each of these lines according to the control signal.

The current sensor 144 is a module for sensing a current (coil current) flowing in the coil of each phase of the stepping motor 20. The current sensor 144 outputs the sensing results of the coil current to the current measuring unit 124.

The current measuring unit 124 is a module for measuring the coil current of the stepping motor 20. The current measuring unit 124 receives the sensing results of the coil current output from the current sensor 144. The current measuring unit 124 measures the coil current based on the received sensing results. The current measuring unit 124 outputs the measurement results of the coil current to the CPU 122.

The back electromotive voltage measuring unit 126 is a module for measuring a back electromotive voltage induced in the coil of each phase of the stepping motor 20. In this embodiment, the back electromotive voltage measuring unit 126 is connected to each of the four lines connecting the drive circuit 14 and the stepping motor 20. The back electromotive voltage measuring unit 126 outputs the measurement results of the back electromotive voltage to the CPU 122.

The CPU 122 receives the measurement results of the coil current from the current measuring unit 124 and the measurement results of the back electromotive voltage output from the back electromotive voltage measuring unit 126. The CPU 122 generates a control signal for controlling the voltage supplied to the stepping motor 20. When driving the stepping motor 20, the CPU 122 generates the control signal based on the measurement results of the coil current. The CPU 122 outputs the generated control signal to the motor drive unit 142.

Figure 2:
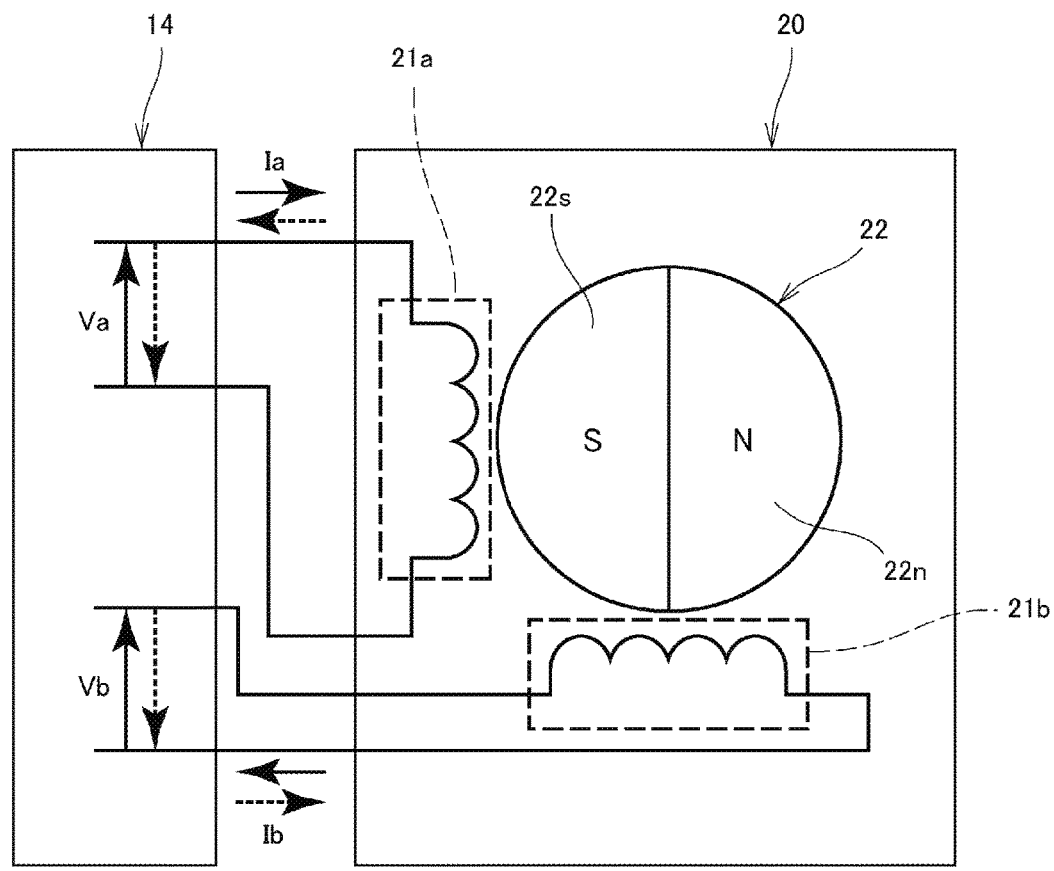
FIG. 2 is a diagram schematically illustrating a circuit configuration of a stepping motor.

FIG. 2 is a diagram schematically illustrating a circuit configuration of the stepping motor 20.

As illustrated in FIG. 2, the stepping motor 20 includes two coils 21a and 21b, a rotor 22, and a plurality of stator yokes (unillustrated).

Each of the coils 21a and 21b is a coil for exciting the stator yokes. Each of the coils 21a and 21b is connected to the drive circuit 14. The coil 21a is the coil of the phase A. The coil 21b is the coil of the phase B. Coil currents of different phases are supplied to each of the coils 21a and 21b.

The rotor 22 includes a multipolar magnetized permanent magnet arranged so that the S pole 22s and the N pole 22n are alternately reversed along the circumferential direction. Note that in FIG. 2, the rotor 22 is simplified so as to include one S pole 22s and one N pole 22n. The stator yoke is disposed around the rotor 22 so as to be close to the peripheral portion of the rotor 22. The rotor 22 rotates by periodically switching the phases of the coil currents flowing in each of the coils 21a and 21b.

In this embodiment, when the stepping motor 20 is driven, the motor drive unit 142 applies a pulse-width-modulated pulse voltage to each of the coils 21a and 21b.

The stepping motor 20 is driven as described below. First, a pulse voltage (coil voltage Va) is applied to the coil 21a so that the polarity of a coil current Ia (that is, the direction of the coil current Ia) changes at a predetermined cycle. Meanwhile, a pulse voltage (coil voltage Vb) is applied to the coil 21b at the same cycle as that of the coil 21a. The pulse voltage is applied to the coil 21b so that the polarity of a coil current Ib (that is, the direction of the coil current Ib) changes with a predetermined phase delay with respect to the coil current Ia.

When the coil currents Ia and Ib flow in the coils 21a and 21b respectively, the stator yokes of the coils 21a and 21b are excited according to the polarities of the coil currents Ia and Ib. Then, the rotor 22 rotates in predetermined steps.

Figure 3:
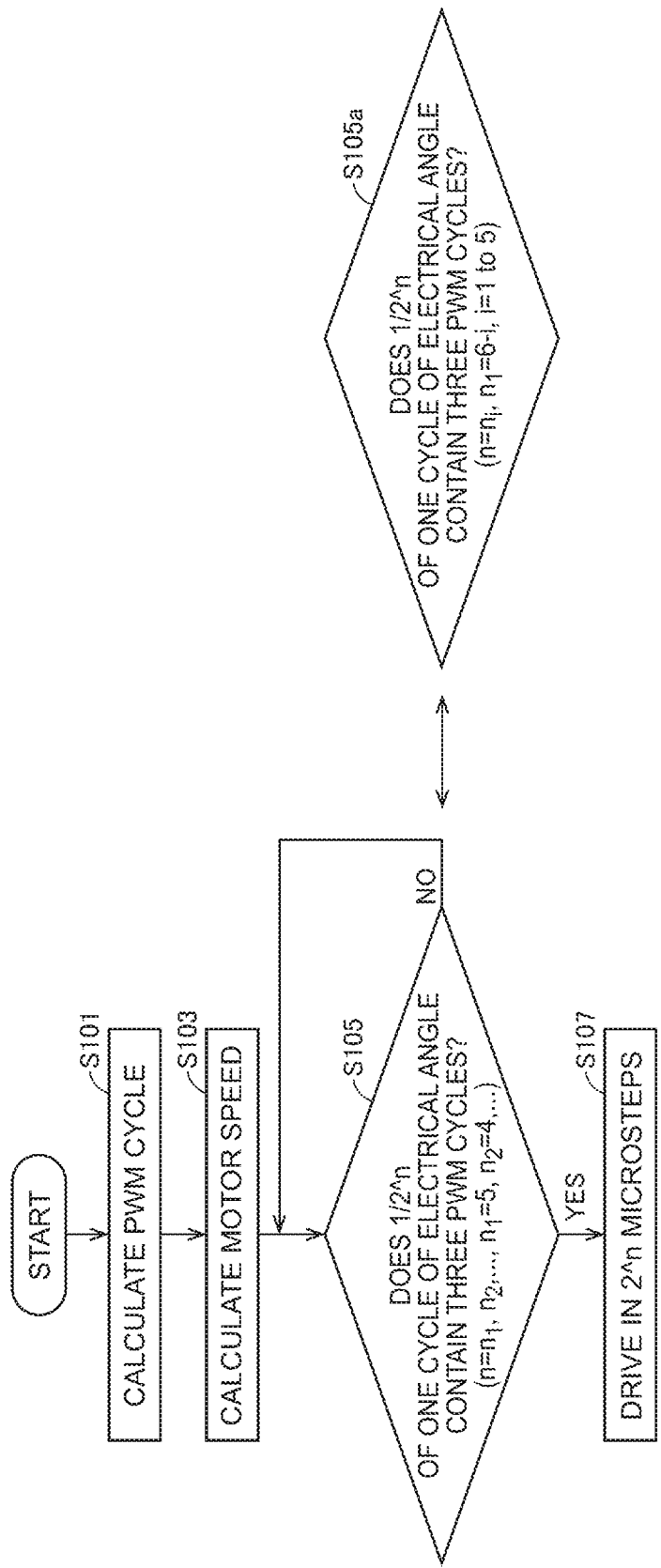
FIG. 3 is a flowchart roughly describing driving of the stepping motor performed by the motor drive controller.

FIG. 3 is a flowchart roughly describing driving of the stepping motor 20 performed by the motor drive controller 10.

The process of the flowchart is performed by the CPU 122. The CPU 122 is a microcomputer incorporating a nonvolatile storage device or memory storing programs executed by the CPU.

In step S101, the CPU 122 calculates the cycle of the PWM (PWM cycle of the PWM base frequency). The cycle of the PWM may be preliminarily stored in memory as a constant. In step S103, the CPU 122 calculates the rotation speed of the stepping motor 20. Examples of the motor rotation speed include 360 pps (pulse/sec), 480 pps, 640 pps, and 800 pps.

In step S105, the CPU 122 determines whether or not the period of $1/(2^n)$ ("$2^n$" indicates 2 to the nth power) of one cycle of electrical angle (one cycle of the motor drive pulse) contains three cycles of the PWM. Values of 5, 4, 3, 2, and 1 are sequentially assigned to n. When YES is determined, the process moves to step S107. This is a process of determining the number of microsteps in one cycle of the electrical angle (number of divisions of one cycle of the electrical angle into microsteps) when one cycle of electrical angle (one cycle of the motor drive pulse) is divided into microsteps. The process in step S105 is to include three or more cycles of the PWM in one microstep cycle of one cycle of electrical angle and increase the number of microsteps as much as possible. $(2^n)$ is the number of divisions of one cycle of electrical angle. Since values of 5, 4, 3, 2, and 1 are sequentially assigned to n, values of 32, 16, 8, 4, and 2 are sequentially selected as the number of divisions. If the CPU has sufficient computing capability, values starting with 6 or more may be sequentially assigned to n. If a value of 2 cannot be used as the number of divisions, a value of 1 may be used as the number of divisions.

In addition, as illustrated in step S105a of FIG. 3, a process similar to that in step S105 may be performed by setting n=6−i, and by sequentially assigning numbers of 1, 2, 3, 4 and 5 to i.

In step S107, the time length of one microstep is set to drive the motor so as to include $(2^n)$ microsteps in one cycle of the electrical angle (one cycle of the motor drive pulse) (so that the number of divisions in one cycle of the electrical angle is $(2^n)$).

FIG. 4 is a diagram describing the driving of the stepping motor 20 performed by the motor drive controller 10 in comparison with the prior art.

FIG. 4 shows the number of microsteps contained in one cycle of the electrical angle (one cycle of the motor drive pulse) in each case where the motor rotation speed is 360 pps (pulse/sec), 480 pps, 640 pps, and 800 pps. The column "two PWMs in one microstep" indicates control by the prior art. In the prior art, the number of microsteps contained in one cycle of the electrical angle (one cycle of the motor drive pulse) is 32, and this number is unchanged even if the rotation speed changes. Since one microstep cycle is about 2 PWM cycles, the number of PWM cycles contained in one microstep cycle is about 2 (or equal to or less than 2).

The microstep in the prior art is represented by frequency as follows:

for 360 pps, 360×32=11.52 kHz
for 480 pps, 480×32=15.36 kHz
for 640 pps, 640×32=20.48 kHz
for 800 pps, 800×32=25.60 kHz First, a problem of the prior art will be described.

Figure 5:
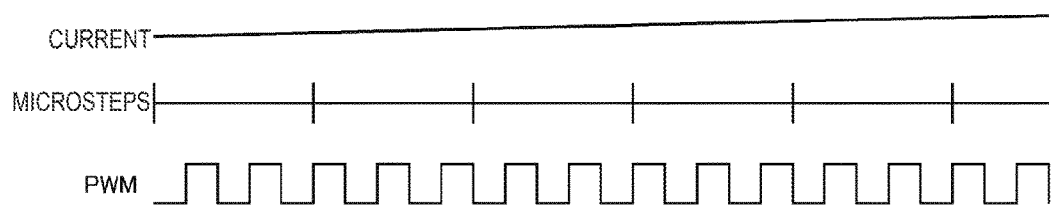
FIG. 5 is a timing chart explaining the driving of the stepping motor performed by the motor drive controller according to the prior art.

FIG. 5 is a timing chart explaining the driving of the stepping motor performed by the motor drive controller according to the prior art.

FIG. 5 shows values of current flowing in the motor coil, microstep cycles, and PWM pulse waveforms in this order from the top with the horizontal axis indicating time. In the prior art, the number of PWM cycles contained in one microstep cycle is less than three (about 2.5 in FIG. 5).

As described above, the PWM base frequency is set to 25 kHz (fixed). In addition, particularly with a small motor, the size of the yoke used is reduced. For this reason, the natural frequency of the motor increases, and the motor has a resonance of around 10 kHz (for example, 12.5 kHz). In the prior art, about two PWM cycles are contained in one microstep cycle. As a result, the current includes 12.5 kHz and 12.5 kHz is a frequency component of two times of the PWM frequency of 25 kHz. Since the current waveform includes high frequency components close to the natural frequency of the motor, a resonance phenomenon occurs, and vibration or noise of the motor is generated. Even if the PWM base frequency is other than 25 kHz, a similar problem occurs when a specific half-wavelength is generated.

The column "three PWMs in one microstep" in FIG. 4 indicates control by this embodiment.

As illustrated in the flowchart of FIG. 3, the motor drive controller 10 according to this embodiment controls so that even if the motor rotation speed (number of drive pulses contained in one second) changes, three PWM cycles are contained in one microstep (one cycle of electrical angle (one cycle of the motor drive pulse) multiplied by $1/(2^n)$). Thus, control is performed such that the higher is the motor rotation speed, the less is the number of divisions ($2^n$) of microsteps, and the longer is the cycle of one microstep.

The microstep in FIG. 4 according to this embodiment is represented by frequency as follows:

for 360 pps, 360×16=5.76 kHz
for 480 pps, 480×16=7.68 kHz
for 640 pps, 640×8=5.12 kHz
for 800 pps, 800×8=6.40 kHz For any speed, the number of PWM cycles included in one microstep cycle is equal to or greater than three.

Figure 6:
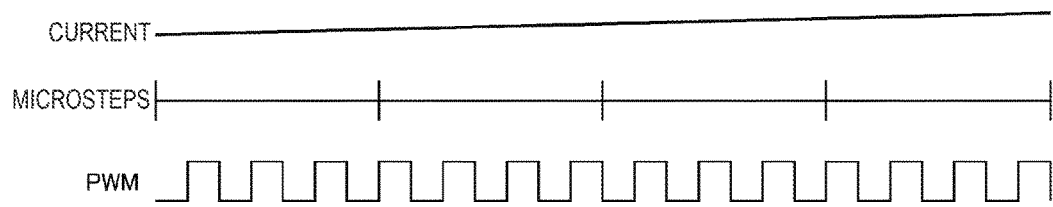
FIG. 6 is a timing chart explaining the driving of the stepping motor performed by the motor drive controller according to an embodiment of the present disclosure.

FIG. 6 is a timing chart explaining the driving of the stepping motor 20 performed by the motor drive controller 10 according to an embodiment of the present disclosure.

FIG. 6 shows values of current flowing in the motor coil, microstep cycles, and PWM pulse waveforms in this order from the top with the horizontal axis indicating time. In this embodiment, the number of PWM cycles contained in one microstep cycle is equal to or greater than three (about 3.5 in FIG. 6).

Note that it is preferable that the relationship among the PWM base frequency f1, the motor natural frequency f0, and the number of PWM cycles contained in one microstep cycle (number of pulse signals of PWM base frequency) m satisfies the following expression.

$$f0 \div k \geq f1/m$$

where k is a margin coefficient with respect to the natural frequency of the motor, and for example, $\sqrt{2}$ is used. A value of 1 may be used for k in the calculation.

When the above expression is transformed, the number m is set as follows:

$$m \geq k \times f1/f0$$

In other words, control is performed so that the number of PWM cycles contained in one microstep cycle is equal to or greater than m. In this embodiment, the PWM base frequency f1=25 kHz, and the motor natural frequency f0=12.5 kHz, and thus the right side of the above expression is as follows:

$$1.4 \times 25/12.5 = 2.8$$

Therefore, it is understood that it is preferable that the number of PWM cycles contained in one microstep cycle (number of pulse signals of PWM base frequency) m is set to be equal to or greater than 2.8.

In this embodiment, the number of PWM cycles contained in one microstep cycle is controlled as described above.

In this embodiment, the number of PWM cycles contained in one microstep cycle is controlled such that a vibration contained in a current waveform determined by the number of PWM cycles contained in one microstep cycle does not approximate the natural frequency of the stepping motor 20. More specifically, the number of PWM cycles is controlled such that a high-frequency component of the number of PWM cycles (contained in one microstep cycle) divided by the PWM base frequency does not approximate the natural frequency of the motor (in the above described embodiment, the peak frequency is shifted from the motor natural frequency of 12.5 kHz by changing the one microstep cycle to correspond to three PWM cycles. It is ideal that when one microstep cycle is equal to three PWM cycles, the frequency of microstep is about 8 kHz=25 kHz/3).

In this embodiment, the motor drive controller 10 has a function of changing the number of PWM cycles contained in one microstep cycle according to the rotation speed of the stepping motor 20. More specifically, the motor drive controller 10 adjusts the number of divisions of microsteps according to the rotation speed of the stepping motor 20 so that the number of PWM cycles contained in one microstep cycle is at least the above number. In other words, the motor drive controller 10 controls the number of PWM cycles contained in one microstep cycle by adjusting the number of divisions of microsteps.

Note that the control method of the motor drive controller 10 configured to drive the stepping motor 20 in microstepping mode according to this embodiment controls the number of PWM cycles contained in one microstep cycle.

In addition, the control program of the motor drive controller 10 according to this embodiment causes a computer to execute the step of controlling the number of PWM cycles contained in one microstep cycle.

Further, the method of determining the number of divisions of a basic step angle (number of microsteps) in the motor drive controller 10 configured to drive the stepping motor 20 in microstepping mode according to this embodiment determines the number of divisions of the basic step angle (number of microsteps) so that a vibration contained in a current waveform determined by the number of PWM cycles contained in one microstep cycle does not approximate the natural frequency of the stepping motor 20.

Effects of Present Embodiment

The effects of this embodiment are as follows.

(1) Control can be made so that the current waveform does not include high frequency components close to the natural frequency of the motor. Therefore, the frequency generated in the current waveform can be kept away from a resonance frequency, and accordingly the motor can be prevented from generating the resonance phenomenon. As a result, vibration or noise of the motor can be reduced.

(2) The number of PWM cycles can be easily adjusted for any rotation speed (even if the rotation speed increases).

(3) It is conceivable to use high frequency PWM signals to achieve the target current waveform by PWM. In this embodiment, the number of pulse signals contained in one microstep cycle is changed by controlling the number of microsteps, and thus the target current waveform by PWM can be achieved by an inexpensive CPU without the need for using an expensive CPU having a high processing speed.

[Modifications]

The natural frequency of the motor is not limited to the above.

The minimum number of PWM cycles is three in the above-described embodiment, but this number varies depending on the PWM base frequency, the motor natural frequency, and the like.

The PWM base frequency is not limited to the above. In addition, the relationship between the rotation speed and the number of microsteps is not limited to that in FIG. 4.

It should be understood that the embodiments disclosed herein are illustrative and non-restrictive in every respect. The scope of the present disclosure is defined by the terms of the claims, rather than the description above, and is intended to include any modifications within the scope and meaning equivalent to the terms of the claims.

What is claimed is:

1. A motor drive controller configured to drive a stepping motor in microstepping mode, wherein the motor drive controller controls the number of PWM (Pulse Width Modulation) cycles contained in one microstep cycle, wherein the motor drive controller satisfies the relationship of the following expression:

$$m \geq k \times f1/f0$$

where f1 denotes a PWM base frequency, f0 denotes a natural frequency of a motor, m denotes the number of PWM cycles contained in one microstep cycle, and k denotes a margin coefficient for the natural frequency.

2. The motor drive controller according to claim 1, wherein
the motor drive controller controls so that the number of PWM cycles contained in one microstep cycle is equal to or greater than the m according to a rotation speed of the stepping motor.

3. The motor drive controller according to claim 1, wherein
the number of PWM cycles contained in one microstep cycle is controlled so that a vibration contained in a current waveform determined by the number of PWM cycles contained in one microstep cycle does not approximate the natural frequency of the stepping motor.

4. The motor drive controller according to claim 1, wherein
the motor drive controller has a function of changing the number of PWM cycles contained in one microstep cycle according to a rotation speed of the stepping motor.

5. The motor drive controller according to claim 1, wherein
microstepping is performed by dividing a basic step angle of the stepping motor, and the motor drive controller controls the number of PWM cycles contained in one microstep cycle by adjusting the number of divisions.

6. A control method for a motor drive controller configured to drive a stepping motor in microstepping mode, the method comprising controlling the number of PWM (Pulse Width Modulation) cycles contained in one microstep cycle so that the number of PWM cycles satisfies the relationship of the following expression:

$$m \geq k \times f1/f0$$

where f1 denotes a PWM base frequency, f0 denotes a natural frequency of a motor, m denotes the number of PWM cycles contained in one microstep cycle, and k denotes a margin coefficient for the natural frequency.

7. A control program for a motor drive controller configured to drive a stepping motor in microstepping mode, wherein
the control program causes a computer to execute a step of controlling the number of PWM (Pulse Width Modulation) cycles contained in one microstep cycle so that the number of PWM cycles satisfies the relationship of the following expression:

$$m \geq k \times f1/f0$$

where f1 denotes a PWM base frequency, f0 denotes a natural frequency of a motor, m denotes the number of PWM cycles contained in one microstep cycle, and k denotes a margin coefficient for the natural frequency.

8. A method of determining the number of divisions of a basic step angle for a motor drive controller configured to drive a stepping motor in microstepping mode, the method comprising:
determining the number of divisions of the basic step angle so that a vibration contained in a current waveform determined by the number of PWM cycles contained in one microstep cycle does not approximate the natural frequency of the stepping motor, so that the number of PWM cycles satisfies the relationship of the following expression:

$$m \geq k \times f1/f0$$

where f1 denotes a PWM base frequency, f0 denotes a natural frequency of a motor, m denotes the number of PWM cycles contained in one microstep cycle, and k denotes a margin coefficient for the natural frequency.

* * * * *